United States Patent [19]

Freeman

[11] Patent Number: 4,507,680

[45] Date of Patent: Mar. 26, 1985

[54] ONE WAY INTERACTIVE MULTISUBSCRIBER COMMUNICATION SYSTEM

[76] Inventor: Michael J. Freeman, 31 Cornwall La., Sands Point, N.Y. 11050

[21] Appl. No.: 390,877

[22] Filed: Jun. 22, 1982

[51] Int. Cl.³ .............................................. H04M 7/10
[52] U.S. Cl. ....................................... 358/86; 358/142; 358/143
[58] Field of Search ........................ 358/86, 142, 143; 458/3, 6

[56] References Cited

U.S. PATENT DOCUMENTS 4,264,924  4/1981  Freeman .................................. 358/86
4,264,925  4/1981  Freeman et al. ....................... 358/86

Primary Examiner—John C. Martin
Assistant Examiner—Edward L. Coles
Attorney, Agent, or Firm—Hubbell, Cohen, Stiefel & Gross

[57] ABSTRACT

Interactive programming may be provided by the system (26) of the present invention which can enable both manual and automatic selection of various interactive responses from simultaneously transmitted programming on different channels. In a cable television system (20), the channels used to transmit the interactive programming are the midband channels with the selected response being treated by the system converter (26) to convert the individually selected response to a common assigned television channel frequency for ultimate reception and display on the subscriber's television (24, 22). Automatic selection may then be accomplished by the provision of a selection signal from the logic network (48) to a local oscillator (52) which, in turn, generates a beat frequency to be mixed in a mixer (54) with the various midband channel frequencies to convert the selected midband channel frequency to the assigned television channel frequency. The selection signal is either manually selected as a result of the choice or selection manually input by the subscriber via a keyboard (50) or automatically generated as a result of the pulse count value accumulated in memory (64, 65,) based on the weighted signal value of prior responses. Various band pass filters (36, 58, 60) and switches (34, 56) are employed to pass the appropriate signals in the interactive and conventional programming modes of the system (26).

33 Claims, 11 Drawing Figures

ONE WAY INTERACTIVE MULTISUBSCRIBER COMMUNICATION SYSTEM

CROSS-REFERENCE TO RELATED APPLICATIONS

This application is related to my previous commonly owned U.S. Pat. No. 4,264,925, entitled "Interactive Cable Television System" naming Michael J. Freeman and Lawrence G. Kurland as joint inventors thereof, and U.S. Pat. No. 4,264,924, entitled "Dedicated Channel Interactive Cable Television System" naming Michael J. Freeman as the sole inventor thereof. The present invention is believed to be an improvement over the subject matter of the aforementioned patents, the contents of which are specifically incorporated by reference herein in their entirety.

TECHNICAL FIELD

The present invention relates to interactive communication systems, such as cable television systems, and particularly to one way systems for providing an interactive information output over a common output channel from a plurality of substantially simultaneously remotely transmitted different information inputs.

BACKGROUND ART

Real time conversational student response teaching apparatus are known, such as described in U.S. Pat. Nos. 3,947,972 and 4,078,316. In addition, multiple choice student response systems are well known, such as exemplified by the systems disclosed in U.S. Pat. Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example. None of these prior art systems, however, has been adapted to be employed in connection with conventional cable television in which an essentially one way system is convertible on a subscriber-by-subscriber basis into what appears to be a two way interactive network in which the television programming information to be received by the individual subscribers is individually selectable to enable the subscriber to receive either selectable multi-information television programming and/or regular television programming on the television reception channels of a conventional multichannel television receiver. Moreover, although prior art subscription cable television systems per se are known in which a plurality of unrelated television programs, under control of a computer, are transmitted over a common television channel for selection by the individual subscribers, such as disclosed in U.S. Pat. Nos. 3,814,841 and 3,757,225, such systems are not one way interactive systems capable of independent subscriber selectable reception of simultaneously transmitted multi-information television programming and regular television programming over a common designated television reception channel. Such an arrangement would greatly expand the educational and entertainment capabilities and horizons of cable television systems with the prior art essentially being concerned with a severely limited quantity of users. The desire to expand the educational capabilities and horizons of mass entertainment media has greatly increased with the advent of cable television in which considerably more channels than were previously available are present. Nevertheless, even though cable television has existed for a number of years, it has not been employed, to applicant's knowledge with the exception of applicant's prior U.S. Pat. Nos. 4,264,925 and 4,269,924, in an interactive conversational type teaching or interactive entertainment system in which a mass audience of people, in addition to their regular programming, can receive individually controllable instantaneous real-time effective interaction with the questions being asked, and/or individual tailored messages or entertainment. Although such a system is described in the above U.S. Pat. Nos. 4,264,925 and 4,264,924, these prior systems do not provide for automatic selection of individual interactive responses based on prior accumulated interactive responses of the individual subscribers, such as by providing weighted values to the various responses. Such an improvement over my prior systems is believed to significantly enhance the educational and entertainment value of such an interactive system while overcoming the various disadvantages of the prior art.

DISCLOSURE OF THE INVENTION

The present invention relates to an interactive communication system, such as an interactive cable television system, for providing an interactive information output over a common output channel from a plurality of substantially simultaneously remotely transmitted different information inputs, such as inputs transmitted at different frequencies which are different from the frequency of the common output channel. The individual information output devices, such as television receivers, are capable of receiving the plurality of remotely transmitted different information inputs and selecting therebetween for selectively providing the interactive information output over the common output channel from one of the received plurality of remotely transmitted information inputs. The plurality of received information inputs contain different selectable information output segments interactively related to a common information message, with each of the related selectable information output segements having an associated detectable weighted signal value. The information output device, such as the aforementioned television receiver, is associated with a logic network for selecting one of the information output segments for providing the interactive information output therefrom. The logic network includes a signal detector, such as a pulse counter, for detecting the associated weighted signal value of the selected information output segment, such as by a pulse count, with the weighted signal value being in accordance with the associated pulse count. The logic network further includes an accumulator for retrievably storing and accumulating the detected associated weighted signal values of the selected information output segments over a predetermined sampling interval for providing a retrievably stored accumulation signal having a value dependent on the sum of the detected associated weighted signal values of the selected signals during the predetermined sampling interval. The logic network is a condition responsive network responsive to detection of enabling tones at various assessment periods for initiating channel selection based on the data previously accumulated in memory. In this regard, each of the channels or concurrently transmitted selectable inputs has an associated selection signal value corresponding to a different stored value in the memory. The possible accumulation signal values correspond to the various available selection signal values, such as for example in a quartiling format or a stacking format of associated pulse counts. Thus, the system can automatically provide an interactive information output in accordance with a stored accumulation of the weighted signal values of prior interactive selections. If desired, these stored values can be preloaded by the subscriber prior to the provision of the interactive programming which will then be presented in accordance with the preloaded conditions in response to enabling tones, or the selections can occur during various sampling intervals throughout the program as it is being broadcast with intermittent assessments being made throughout the program. In either instance, for an interactive subscriber television system wherein each of the different information outputs are at different television channel frequencies, these television channel frequencies of the transmitted inputs are preferably at different frequencies in the midband range and are selectively converted to the common output channel television channel frequency by a mixer based on the selection signal. Since the midband range is not normally directly receivable for directly providing the information output on the television receiver, if desired, only one channel need be allocated for an interactive program having this interactive capability which, of course, can be provided in addition to conventional television programming over the television receiver. As was previously mentioned, the transmission of enabling tones from the head end can be used to control the sequence of operation of the system in all of the subscribers homes, with the particular programming observed in an individual subscriber's home being dependent on that subscriber's individually obtained score in memory based on his prior interactive responses and their respective associated weighted values. Apart from the above, the system allows the individual subscriber to act as his own television director, if desired, by broadcasting different camera angles for a given scene on the different channels, either live or prerecorded, allowing the subscriber to select the desired camera angle by channel selection.

BEST MODE FOR CARRYING OUT THE INVENTION

Figure 1:
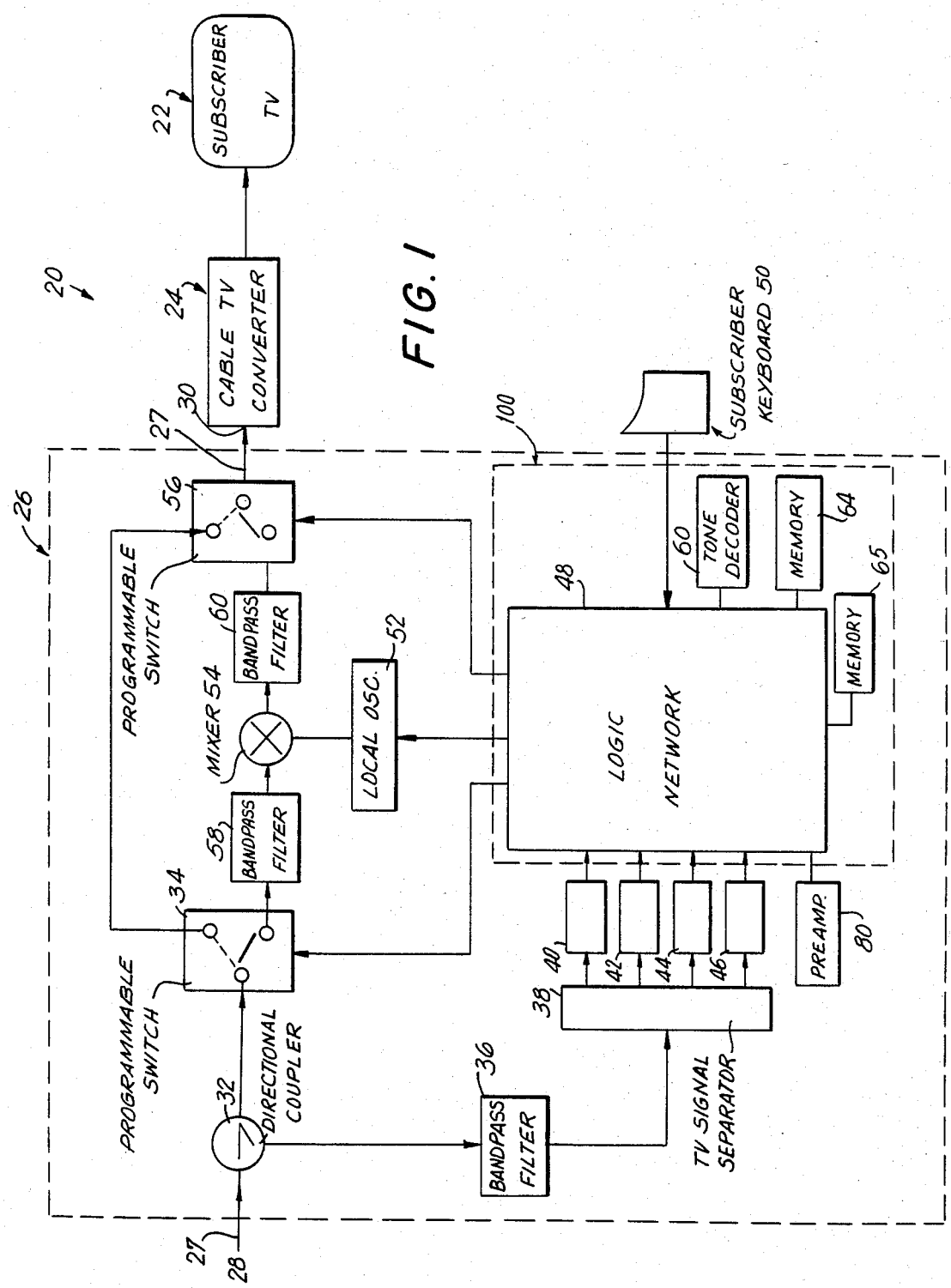
FIG. 1 is a block diagram of the overall presently preferred in-home portion of the interactive subscriber television system in accordance with the present invention illustrating a typical subscriber home installation as an adjunct to a conventional cable television system.

Referring now to the drawings in detail and initially to FIGS. 1 and 2 the presently preferred embodiment of the interactive communication system of the present invention will be described in terms of a typical preferred conventional subscriber television system network, with a typical in-home installation of such a subscriber in the network being illustrated in FIG. 1 and generally given reference numeral 20. Although the presently preferred interactive communication system of the present invention will have many utilizations which will occur to those of ordinary skill in the art, for illustrative purposes, the system will be described in terms of the preferred utilization in a subscriber television network 20 and, as such, the system shall be described as an improvement on the prior systems described in my previous U.S. Pat. Nos. 4,264,925 and 4,264,924, the contents of which are specifically incorporated by reference herein in their entirety. As shown and preferred in FIG. 1, the preferred subscriber in-home system 20 of the present invention preferably includes a conventional subscriber television receiver 22 which is conventionally connected to a conventional multichannel cable television system converter 24 which enables the television receiver 22 to receive conventional cable television programming over a wide variety of television channels. In accordance with the presently preferred system of the present invention, an additional television converter 26 is preferably inserted in parallel in the cable line 27 between the cable input 28 and the input 30 to the cable television system converter 24 so that the preferred interactive television programming can be selectably received and displayed by the television receiver 22 after appropriate pretreatment of the input information. Of course, if desired, the system converter 24 could be modified to incorporate converter 26 so that the subscriber need only have one converter box in the home. Preferably, as will be described in greater detail hereinafter, the interactive television programming may typically be provided for display on a single channel of the television receiver 22, after pretreatment, with the various selectable television inputs used to provide the interactive programming preferably being simultaneously transmitted in the midband range so as not to normally be directly displayable on the television receiver 22 unless selectably pretreated and converted to the channel frequency of the assigned television channel. Of course, although the system of the present invention will be described with reference to a single ineractive programming television channel, any number of such channels may be provided with appropriate modifications where required.

The presently preferred television converter 26 which is employed to pretreat the incoming remotely transmitted inputs from which the interactive output is selected, preferably includes a conventional directional coupler 32 having one output thereof provided to a conventional programmable switch 34 and the other output further provided, through a conventional bandpass filter 36, to a conventional television signal separator 38. For purposes of illustration, we shall assume that the interactive programming comprises four different information inputs which are substantially simultaneously remotely transmitted in the midband frequency range, each at a different frequency. Therefore, the output of the conventional television signal separator 38 comprises the four different frequency separated inputs which are then provided in parallel to conventional demodulators 40, 42, 44 and 46 whose outputs are in turn, subsequently provided to a condition responsive logic network 48 to be described in greater detail hereinafter with reference to FIGS. 6 and 7. Another input to the logic network 48 is provided from the subscriber keyboard or channel control box 50 which is preferably a conventional type keyboard containing various switches or keys associated with each of the possible selectable inputs. As previously mentioned, if desired, the conventional cable television converter keyboard 24 could be utilized with slight modification so as to dedicate particular keys to the interactive communication system in a particular mode or a separate keyboard 50 for the interactive channel control could be provided as illustrated in FIG. 1. The output of the logic network 48 is preferably provided to a conventional local oscillator 52 which provides a beat frequency which when mixed with the selected transmitted information input frequency in a conventional mixer 54, provides the information associated with that selected input at the television frequency of the common assigned output channel so that the information content of the selected input or channel can be displayed on the television receiver 22 assigned channel. If however, conventional television programming is selected by the subscriber, then the programmable switches 34 and 56 are preferably disposed so as to effectively bypass the pretreatment stage, with these switches 34 and 56 being shown in this bypass position by the dotted lines in FIG. 1. In this position the mixer 54 and associated logic network 48 are bypassed with the incoming television signals being directly passed to the conventional cable television system converter 24. However, if the subscriber desires to receive the interactive programming, then the programmable switches 34 and 56 are placed, either manually or automatically in the position shown by the solid lines in FIG. 1, which thereby causes all of the incoming television signals to pass through conventional band pass filter 58, mixer 54 and band pass filter 60. In this mode, when the television converter 24 is on the interactive channel, the incoming television input signals are mixed in mixer 54, with only the selected channel at the appropriate channel frequency of the common output channel designated for the interactive mode preferably being passed to the cable converter 24 and therefrom to the television receiver 22 for display. If the television converter 24 is switched from the assigned interactive channel, then preferably this would cause the programmable switches 34 and 56 to be switched to the dotted line bypass position, either automatically such as due to a mechanical or electrical connection, or manually.

Figure 3:
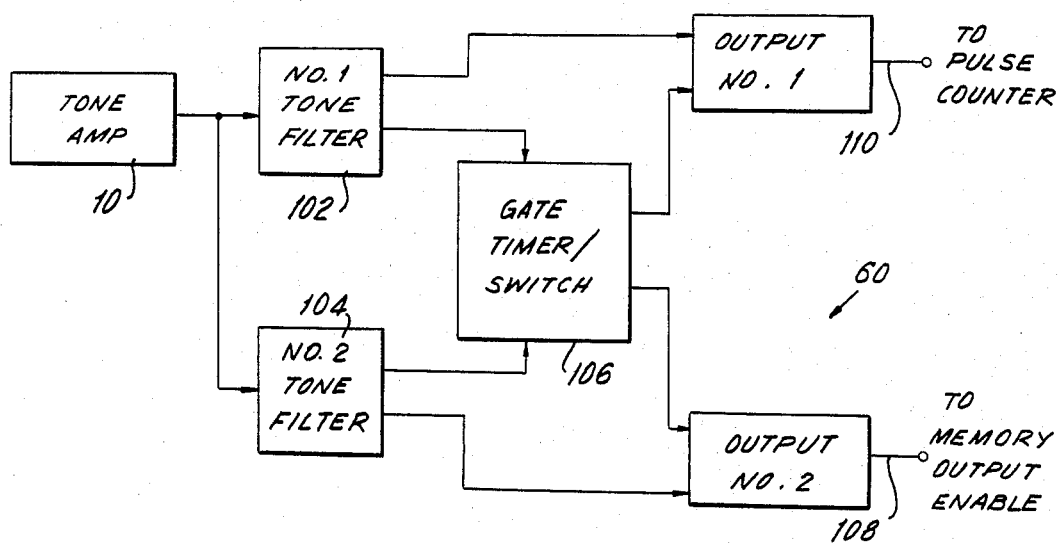
FIG. 3 is a block diagram of a typical tone decoder for use in the system of the present invention.
Figure 9:
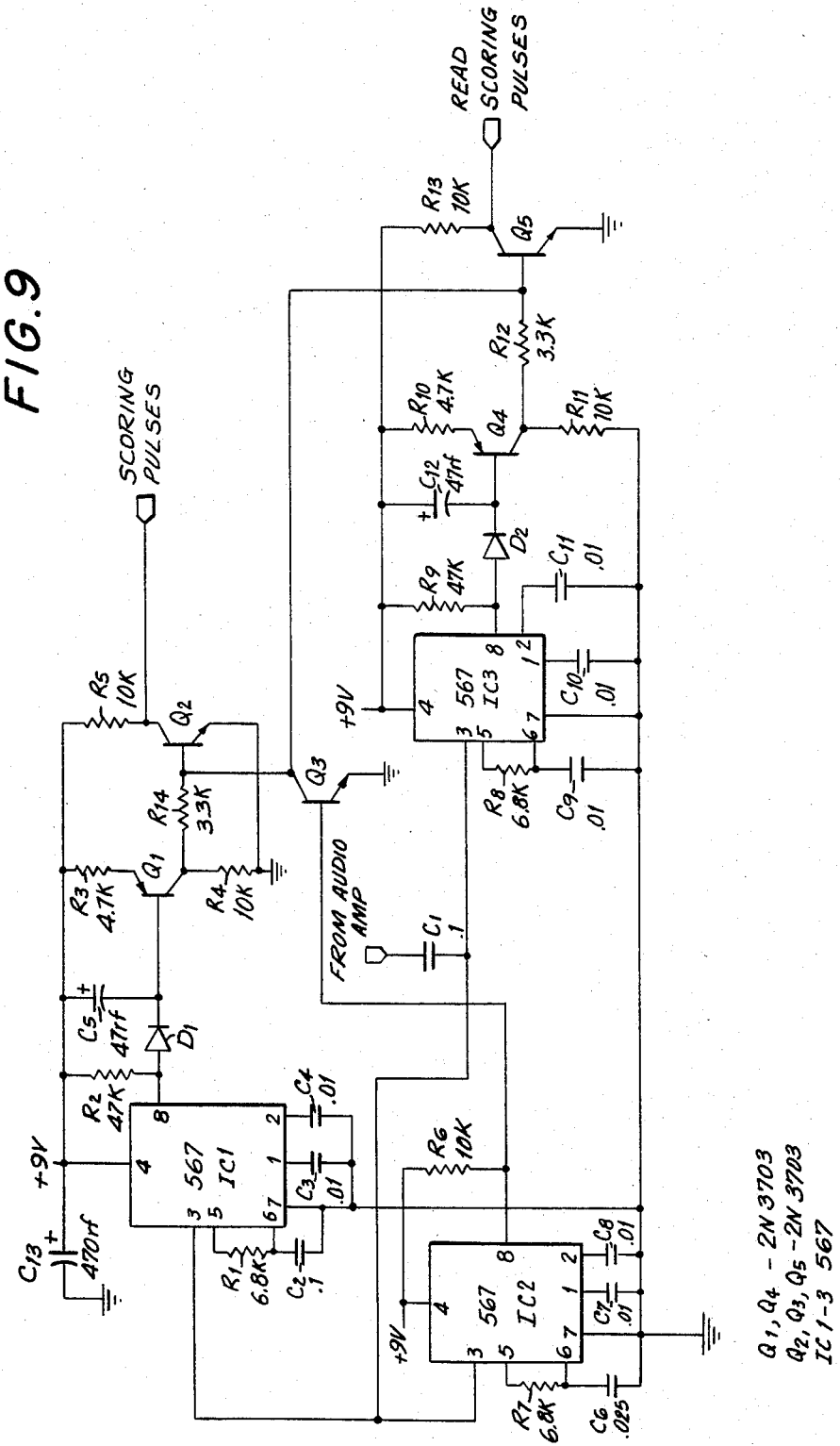
FIG. 9 is a schematic diagram, partially in block, of a typical channel decoder used in accordance with the system of the present invention.

As will be described in greater detail hereinafter, the subscriber at home, in the above example, selects one of four choices or channels in the midband range by, for example, depressing one of four keys on the interactive keyboard or channel selector 50. Preferably, no actual selection or pretreatment of information occurs until an enable tone, which is preferably broadcast from the head end, is detected, with the enable tone preferably being remotely transmitted from the head end on all of the four selection channels or inputs. This enable tone is preferably detected by a conventional type of tone decoder 60, such as the tone decoder 60 illustrated in greater detail in FIGS. 3 and 9. As will be described in greater detail hereinafter, the remote transmission and detection of enable tones preferably controls the sequence of operations at all of the individual subscribers' television receivers with each receiver individually responding based on the individual selections of the subscriber at home. In this manner, the subscriber at home can change answers, push buttons or whatever with nothing occuring until the appropriate enable tone, transmitted from the head end has been detected by the tone decoder 60, with the last change which has made by the subscriber then preferably being implemented by the the logic network 48, as will be described in greater detail hereinafter. The various selections of the individual subscribers each have preassigned weighted signal values, such as various associated pulse counts, with a pulse counter/memory or score memory 64, such as an 84 bit memory, preferably being provided for accumulating and storing the weighted signal values or pulse counts associated with each of the interactive information inputs selected by the individual subscriber. Such a typical counter memory 64, which is a conventional pulse counter storage device, is illustrated in greater detail in FIGS. 4 and 10. The memory 64 is preferably connected to the logic network 48 to provide information thereto for use in channel selection as will be described in greater detail hereinafter. As was previously mentioned, the pulse count which is accumulated by the counter memory 64 is the pulse count associated with the information to be viewed which has been preselected by the subscriber via the keyboard 50. The inputs or channels which are not viewed, thus, preferably have no relevance to the counter memory 64 and their associated pulse count values are ignored in the memory 64. An additional memory 65 may also preferably be provided for connection to logic network 48 so as to provide even greater flexability to the system 20 such as to enable certain interactive choices to be preloaded into the system 20 prior to the transmission of the actual interactive programming, such as in having the subscriber preselect the contents of an individual story to be displayed on the television 22 which has been individually tailored by the subscriber's choices prior to the broadcast of the story. With respect to the above, it should be noted that since this system 20 is a one way system, the choices of the individual subscriber remain private to that subscriber. Of course, if desired, such a system can lend itself to incorporation in a polling service which could ask the subscriber to submit a recording of choices to the polling service at designated times, such as by providing an additional plug-in auxiliary memory for storing these choices for such a purpose, which memory could be read via a modem for transmission by the subscriber to a central polling service data base.

The subscriber, preferably, interactively selects different ones of the four possible responses or choices, provided during a program sequence, either in advance or intermittently during broadcast, with each of these possible choices having a weighted pulse value which is accumulated in memory. Thereafter, in accordance with the selection and preselection of the appropriate enabling tones, a beat frequency is generated in accordance with the selected signal, such as in the manner described in U.S. Pat. No. 4,264,925, mixed in the mixer 54 and the selected choice provided as the information output at the designated or common output channel television frequency to the receiver 22 for display. Preferably after a given number of such interactive responses, determined at the studio-head end, assuming no preloading of selections, a second enabling tone is transmitted which is then decoded and provided to the logic 48 to cause the memory 64 to be read. If desired, and preloading is employed, as will be described in greater detail hereinafter, a different enabling tone could be transmitted to cause memory 65 to be read and, subsequently, to cause memory 64 to be read, or some other desired sequence of operation selected from the head end based on the particular interctive programming sequence desired by the creator of the interactive program. In either instance, a particular accumulation of pulses preferably corresponds to one of the four possible choices which can then, in response to the appropriate enabling tone, be automatically selected by the logic 48. Thus, if a quartiling storage scheme were employed, assuming 84 bits or possible pulses to be accumulated in a sampling interval in memory 64, then a count of 1–21 could result in automatic selection of channel A, a count of 22–42 could result in automatic selection of channel B, a count of 43–63 could result in automatic selection of channel C and a count of 64–84 could result in automatic selection of channel D, with the automatically selected interactive response from memory 64 thus being based on or interactively related to the preceding pattern of interactive responses selected by the subscriber during the sampling interval which resulted in the above count somewhere between 1 and 84. Preferably, the enabling tone which causes the memory 64 or the memory 65 to be read is provided at an assessment period at the end of the sampling interval or some other designated time during the programming. If desired, a stacking storage scheme could be employed in addition or in place of the above quartiling scheme for providing the aforementioned automatic selection signal based on the accumulation value of the pulse count in memory 64. In such an instance, when the appropriate enabling tone from the head end is detected during the assessment period, the logic 48 would generate a selection signal to cause automatic selection of one of the four possible channels A through D in accordance, by way of example, based on the following storage scheme for memory 64: a stored pulse count of 1 through 14 would correspond to channel A; a stored pulse count of 15 through 28 would correspond to channel B; a stored pulse count of 29 through 42 would correspond to channel C; and a stored pulse count of 43 through 84 would correspond to channel D. This would then preferably be followed by another enabling tone provided from the head end which, when detected by the tone decoder 60, would cause the logic 48 to again generate a selection signal to cause automatic selection of one of the four possible midband channels A through D now based on the following storage scheme for memory 64: a stored pulse count of 1 through 42 would correspond to channel A; a stored pulse count of 43 through 56 would correspond to channel B; a stored pulse count of 57 through 70 would correspond to channel C; and a stored pulse count of 71 through 84 would correspond to channel D. The above stacking storage scheme would in effect give a 1-in-6 selectivity for the subscriber's choice, with four channels, as opposed to a 1-in-4 selection scheme. If desired, another enabling tone could, subsequently be transmitted and detected to cause the logic 48 to return the system 20 to the original channel it was on before the above automatic selection took place. In addition, if desired a subsequent tone could then be transmitted from the head end and detected to cause the logic 48 to switch the system 20, by way of example to channel A automatically. Furthermore, a different tone could be transmitted from the head end at any desired time and detected to cause the logic 48 to reset the memory 64 or memories 64 and 65 to 0. Of course, tones need not be employed and, if desired, the above could be accomplished digitally. In either instance, the tones or digital information is preferably inaudible to the subscriber at home and does not interfere with the picture signal.

In any event, the creator of the interactive programming, preferably utilizes the enabling tones generated from the head end to cause any desired sequence of operations to be performed at the subscriber's terminal dependent on the contents of the various memories 64, 65, by way of example, associated with the logic 48 at the subscriber terminal. For example, through the use of enabling tones and the memories 64 and 65 the individual subscriber 20 can preload certain conditions into the system 26 which can be utilized to thereafter automatically select or create or specifically tailor a program for that subscriber which will be different from that created by another subscriber who will simultaneously see a different program in response to the same enabling tones generated from the head end. In this regard, assume that the interactive program to be transmitted involves the creation of a story by the subscriber at the beginning of the program. If preloading were to e employed, the narrator would ask the subscriber to make certain choices in advance in the story about to be viewed and these choices would be preloaded into the memories 64 and 65. Thus, for example, the subscriber could be asked, in a four channel system, to first select whether the character in the story is met by a pig or a dog and, thereafter, whether he meets a warrior or a spaceman. Depending on these possible choices, the subscriber could wind up on 1 of the 4 possible channels A through D. Each of these four possible channels would have a corresponding value which, in response to an enabling tone, could be loaded into memory 65. The subscriber, by way of example, could then be given more choices, such as whether the character turns into a horse or a dragon and, thereafter, whether he then meets a wicked witch or a good witch. Again, each of these groups of possible choices would cause the subscriber to wind up on 1 of the 4 possible channels A through D with each having a different corresponding value. The selected choice value could then be loaded into the other memory 64 in response to another enabling tone. Assuming that the above choices are the only choices to be made in the above example, another enabling tone could then be provided from the head end, detected and provided to the logic 48 to cause the selection process to begin as the interactive story is then broadcast, with the next detected enabling tone causing memory 65 to be read and with the next subsequent detected enabling tone causing memory 64 to be read and the appropriate selection signals to be generated by the logic 48. Of course, any combination of memories and storage schemes can be employed, together with the logic 48 and the generation of enabling tones from the head end to enable any desired interactive programming to be presented based on preloaded conditions or choices, intermittent conditions or choices which are made by the subscriber as the program progresses, or a combination of both. In any event, the use of enabling tones and the storage of weighted signal values allow significant flexibility for the system in providing an interactive one-way communication system. Many other applicatoins of the system because of its flexability will readily occur to one of ordinary skill in the art, such as, by way of example, interactive game shows in which the subscriber can be scored as he plays or personalized advice programs, personalized or tailored advertising, story creation, etc., or even permitting the individual subscriber to direct his own scenes from live or prerecorded camera outputs simultaneously broadcast on the four channels of the above example. Moreover, although the system is described in terms of a cable television system, this is meant to include any type of mass distribution media such as microwave, by way of example.

Referring now to FIGS. 3 through 10, the converter 26 of the present invention which pretreats the input signals so as to enable the above interactive programming to occur shall now be described in greater detail. The logic network 48, local oscillator 52 and mixer 54, together with the balance of the converter unit 26 preferably act as an RF-to-RF frequency transposing device which is capable of converting the substantially simultaneously transmitted different information inputs contained on, by way of example, any one of the four individual midband incoming channels A to D to the frequency of the common assigned output television channel. For example, as shown and preferred in FIGS. 1 and 2, the converter 26 is capable of changing any one of the different information television inputs on channels A, B, C or D, represented by bandpass filters 58a, 58b, 58c and 58d, to the common output channel television frequency, such as for channel 3, in response to a selection signal from the logic network 48 which causes the generation of the appropriate beat frequency from the local oscillator 52 which is then conventionally mixed in mixer 54 with the various frequencies of the different inputs to convert the selected input to the common assigned television output channel frequency. With respect to FIG. 2, certain elements have been omitted from the diagram for purposes of clarity, with FIG. 2 diagramatically illustrating the data flow as opposed to the circuit per se which is illustrated in FIG. 1. By way of example, in order to understand the aforementioned conversion process, a typical single visual or video signal shall be followed through the system 20 of FIG. 1. Assuming that the system 20 is employed in a subscriber television network, such as a CATV television network, all of the television programming conventionally emanates from the head end which, in accordance with the present invention, preferably provides both conventional programming and the interactive programming of the present invention through the television subscriber distribution network to the individual subscribers 20. In this regard, as will be described in greater detail hereinafter, the individual subscriber television 22 is capable of receiving both conventional television programming and the presently preferred interactive programming. However, as previously mentioned, whereas the conventional CATV television programming is directly receivable on the individual subscriber television 22 after being conventionally converted by the cable television converter 24 the interactive programming is preferably broadcast in the midband channels which are not normally capable of direct reception on the subscriber television 22 after conversion by the cable television converter 24 and, thus, these midband channels must be converted to a directly receivable television channel frequency, such as channel 3, on the above example display on the subscriber television 22. For example, as previously mentioned, if the individual subscriber does not want to use the interactive programming mode, then programmable switches 34 and 56 can be set in the positions shown by the dotted lines in FIG. 1 and all television programming emanating from the head end will be directly passed to the cable television converter 24. Since the midband channels are not normally directly receivable on the subscriber television 22 because of their associated transmission frequency, the interactive programming will not be displayed and only the conventional television programming will be displayed. However, if the subscriber wishes to receive programming in the interactive mode, then the programmable switches 34 and 56 would be set to the positions shown by the solid lines in FIG. 1 thereby requiring all of the television programming transmitted from the head end to pass through band pass filter 58, mixer 54 and band pass filter 60, so as to be selectively converted to the frequency of the assigned cable television channel, before being passed on to the cable television converter 24.

The various interactive televison inputs simultaneously transmitted at the designated midband channel frequencies are preferably picked up from the main distribution flow by the use of the aforementioned conventional directional coupler 32, band pass filter 36, and signal separator 38, with the various outputs of the conventional TV signal separator 38 being distributed to the conventional demodulators 40, 42, 44 and 46, one demodulator being dedicated to each of the four different midband channels being employed in the above example. The audio information is preferably conventionally stripped from the incoming television signals by the demodulators 40, 42, 44 and 46 and provided to the logic network 48. It should be noted, by way of example, that the logic network 48 may control any number of transmitted channels or inputs, such as two, four, eight or more different channels, even though in the present example, only four television channels are being described. As previously mentioned, the programmable switches 34 and 56 may either be set manually or by a command from the logic network 48, to the solid line position shown in FIG. 1, to allow all the television signals transmitted from the head end to reach the band pass filter 58. In the above example, the transmitted midband channel frequencies are selected as being between 121.6 megahertz and 144 megahertz for the aforementioned midband channels A, B, C and D. Thus, band pass filter 58 is selected to conventionally reject all frequencies except those between 121.6 megahertz and 144 megahertz which are thus passed with minimal attenuation. These midband channel frequencies which have been passed by filter 58 are then routed to one of the inputs of the conventional mixer 54 whose other input is the output of the conventional local oscillator 52. As previously mentioned, the local oscillator 52 conventionally produces a stable, unmodulated signal at a selected beat frequency determined by the generated logic network 48 selection signal so that the appropriate selected midband channel A, B, C or D is conventionally converted to the assigned common output channel television frequency by mixer 54. By way of example, assuming channel 3 is the assigned common output channel for the interactive programming, although any number of channels may be employed with each having it own independent interactive capability, then the desired television channel output frequency would be 61.25 megahertz. Thus, if the associated frequency of the selected midband channel, such as channel C, is 133.25 megahertz, then the beat frequency to be provided from the local oscillator 52 would be a local oscillator frequency of 72 megahertz which when conventionally combined or mixed in the mixer 54 produces an output frequency of 61.25 megahertz plus other harmonics. The resultant output signals from the mixer 54 are then preferably passed through another conventional band pass filter 60 which, in the above example of a 61.25 megahertz television channel, is adjusted to reject all signals except those between 60 and 66 megahertz, by way of example, thereby providing a narrow band pass filter for the channel 3 television frequency, rejecting all other frequencies including the produced harmonics. The 61.25 megahertz signal derived from the mixer 54 therefore passes through the band pass filter 60 and the programmable switch 56 to the cable television converter 24 which recognizes it as the channel 3 television channel frequency and conventionally provides this input to the subscriber television 22 for reception and display thereon. Thus, in the above example, channel C television signals which are at a midband frequency have been converted into channel 3 television signals. It should be noted that the audio and various other carriers within the television channel are all preferably converted in essentially the same way and will not be described in greater detail hereinafter.

Preferably the system 20 powers up to channel A, by way of example, when power is applied which automatically resets the memories 64, 65. In this manner, the transmission gate associated with channel A is activated or enabled allowing the cable input to pass channel A through the band pass filter 36, with channel A then being demodulated and converted in the above manner to be received on common television channel 3. The logic network 48, memories 64, 65 and the sound decoder 60 may preferably form part of a conventional four bit microprocessor 100 which is capable of decoding various specific digital or pulse commands that the program creator has preferably applied to the various sound carriers on the midband channels A through D being received, with these commands or tones preferably being inaudible to the television subscriber at home. As shown and preferred in FIG. 2, the system 20 preferably includes a conventional audio preamplifier 80, shown in greater detail in FIG. 5, for receiving the serial input data signal and applying it to the sound decoder 60 which decodes this signal and utilizes it to drive the input of the aforementioned four bit microprocessor 100 by filtering out all sounds or tones other than the frequencies associated with the specific coded digital information. The sound decoder 60 then routes these detected control signals to either the logic network 48 or the appropriate memories 64, 65. The logic network 48 preferably has total control of changing channels via the read/write command supplied to it from the sound decoder 60 which, as previously mentioned, decodes this information from the sound carrier of the midband channels being simultaneously broadcast for providing the aforementioned interactive programming. By way of example, these detected digital command signals, which are transmitted from the head end to all subscribers can request a channel to be changed automatically as a result of the accumulated contents of the score memory 64 to be described in greater detail hereinafter, and/or the contents of memory 65, by means of the subscriber keyboard 50, or directly as a result of the digital read/write command itself, or some combination thereof. Thus, in the interactive programming mode, the subscriber answers questions or changes channels when requested to do so by the information being broadcast from the head end and accomplishes these changes by making selections on the subscriber keyboard 50, with the changes or selections either being preloaded into memory 64, 65 prior to display of the program or intermittently at various points during display of the program or some combination thereof. In any event, preferably these selections are not acted upon until an appropriate enabling signal or tone is transmitted from the head end and received by the logic network 48 thereby causing the selection to then be processed.

Figure 4:
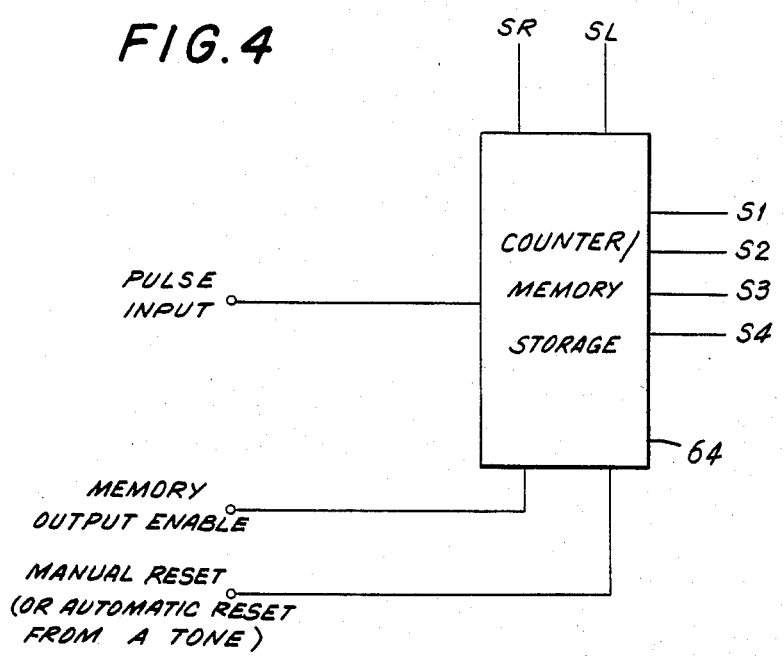
FIG. 4 is a block diagram of a typical counter/memory for use in accordance with the system of the present invention.
Figure 5:
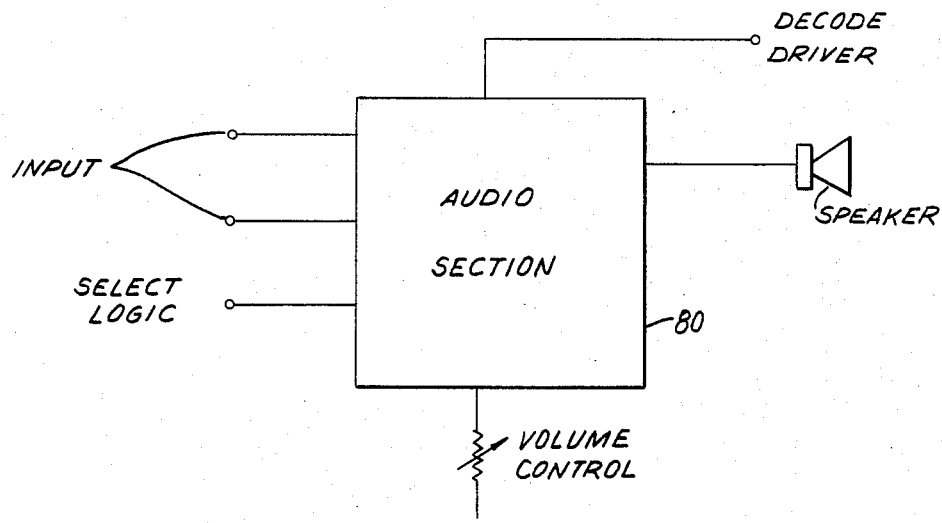
FIG. 5 is a block diagram, partially in schematic, of a typical audio amplifier for use in the system of the present invention.
Figure 10:
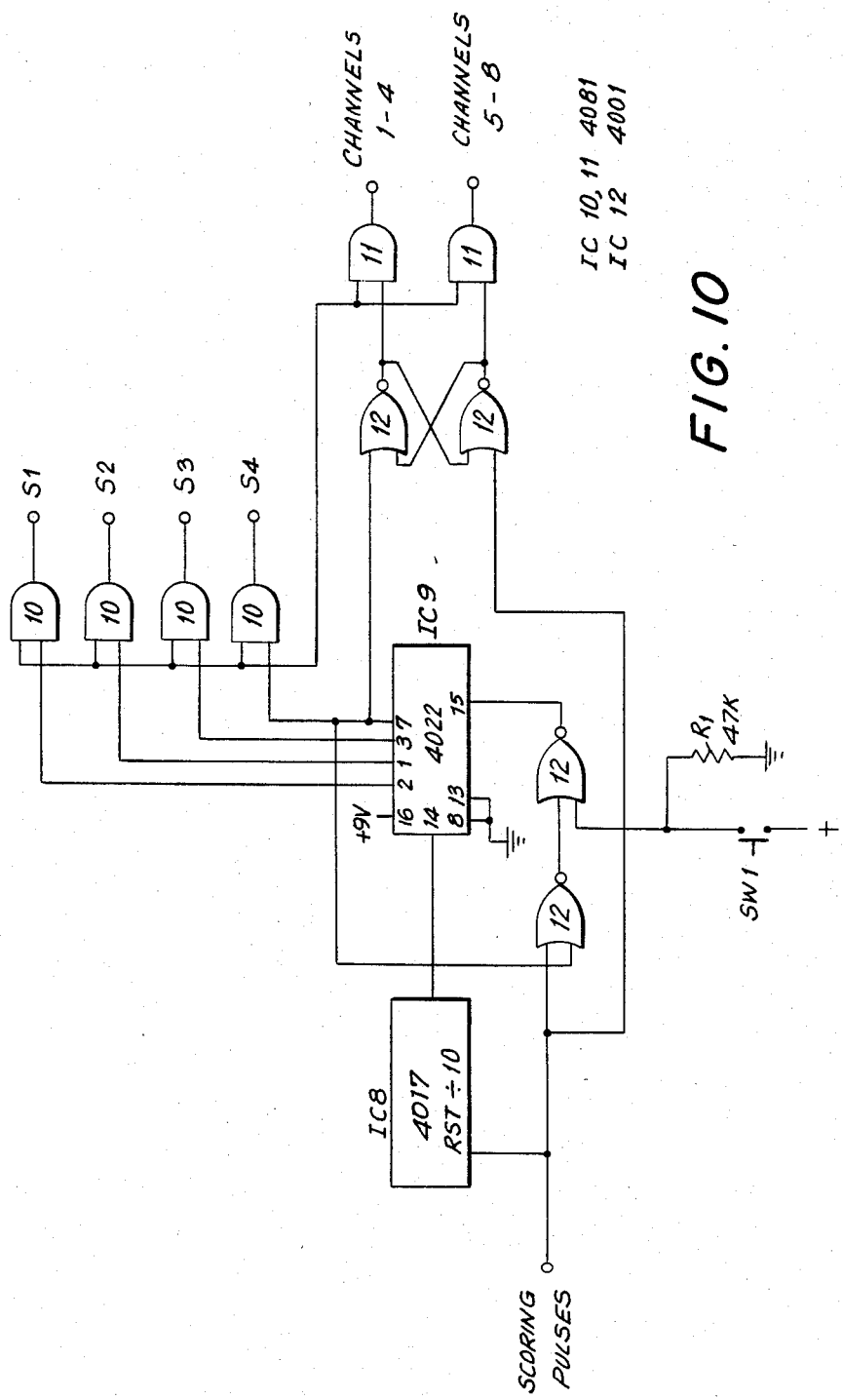
FIG. 10 is a schematic diagram, partially in block, of the counter/memory of FIG. 4.

Various elements of the system 20 circuitry are shown in greater detail in FIGS. 3 to 10. Thus, referring to FIG. 3, a typical circuit for tone decoder 60 is illustrated. Preferably, two distinct tones may be used to provide the respective enabling signals so that any voice present in the received signal will not unintentionally activate the pulse counter 64, to be described in greater detail hereinafter, which is part of the detection circuitry for decoding the command signals transmitted from the head end. With respect to the tone decoder 60, assuming two tones are employed, the tone signals present in the sound carrier of the transmitted midband channels are preferably fed to the input of a conventional tone amplifier 101, with the output thereof being fed to a pair of conventional tone filters 102 and 104 which are set to pass only specific tone frequencies. One tone is preferably the enable signal while the other tone is the particular command signal. The various tones which are at the correct frequencies detected by filters 102 and 104 preferably produce a DC output voltage which enables a gate circuit 106 thereby providing an enable signal via path 108 to the appropriate memories 64, 65 and a pulse count signal which is the weighted signal value of the selected midband channel, to the conventional pulse counter part of the memory 64 via path 110. The pulse counter preferably forms part of the accumulation memory 64 and is illustrated in FIGS. 4 and 10 with FIG. 10 illustrating a possible eight channel arrangement which is capable of handling the four midband channel arrangement of the above example. The pulse counter memory 64 may be cleared or reset at the beginning of each interactive programming interval, if desired, or at the end of the entire interactive programming sequence. This may be accomplished automatically by means of a reset tone or manually by the subscriber by means of a reset button. Preferably the pulse counter 64 conventionally increments and stores each input pulse and, by way of example, may have a storage capacity of 84 bits or pulses. When the memory output enable circuit is enabled or activated by means of the enable pulse provided via path 108 from the sound decoder 60, which pulse has been detected and decoded from the sound carriers of the midband channels transmitted from the head end, the system 20 will select, automatically, one of the four midband channels being broadcast, assuming a four channel system, or one of the eight channels being broadcast assuming an eight channel system, depending on how many pulses have been accumulated in memory 64. In this regard, it should be noted that decoder 60 and pulse counter/memory 64 preferably only accumulate the weighted signal values or pulses associated with the selected channels, disregarding the pulse counts or weighted signal values associated with the channels that have not been selected by the subscriber by means of conventional condition responsive logic in logic network 48. As was previously mentioned by way of example, the accumulation code in the score memory or accumulation memory 64 which can be employed to automatically generate a selection signal to the logic network 48 for causing automatic selection of one of the simultaneously broadcast midband channels may be in accordance with a quartiling code or a stacking code. With respect to a quartiling code, as previously mentioned, assuming four midband channels are being simultaneously broadcast to provide the interactive programming, then channel A could be automatically selected if 1 to 21 pulses have been accumulated in memory 64, channel B could be selected if 22 to 42 pulses have been accumulated in memory 64, channel C could be selected if 43 through 63 pulses have been accumulated in memory 64 and channel D could be automatically selected if 64 through 84 pulses have been accumulated in memory 64. If, however, a stacking code is employed, an even finer selection process can be employed. This preferably requires two selection steps in the process. In the first step, as previously mentioned, by way of example, channel A would be automatically selected if 1 to 14 pulses were accumulated in memory 64, channel B would be automatically selected if 15 to 28 pulses were accumulated in memory 64, channel C would be selected if 29 to 42 pulses were accumulated in memory 64 and channel D would be selected if 43 through 84 pulses were accumulated in memory 64. After this sequence, a second assessment sequence would then be implemented in which channel A would be automatically selected if 1 to 42 pulses were accumulated in memory 64, channel B would be automatically selected if 43 to 56 pulses were accumulated in memory 64, channel C would be automatically selected if 57 to 70 pulses were accumulated in memory 64 and channel D would be automatically selected if 71 through 84 pulses were accumulated in memory 64. Thus, by combining the above two selection sequences in the stacking mode, a 6-to-1 ratio is provided instead of the 4-to-1 selection ratio provided by quartiling alone. Of course, the contents of the transmitted interactive programming would take into account the automatic selection sequences, including their extent and other characteristics, such as described in my previous patents relative to interactive programming. Moreover, for an eight channel system, the various accumulation amounts can be appropriately varied so as to permit automatic selection of eight channels versus four, by way of example, etc. With respect to the balance of the counter memory storage circuit illustrated in FIG. 10 it is conventional and need not be described in greater detail hereinafter. In this regard, conventional components have been labeled with their conventional logic component numbers by which they may be commercially obtained.

Figure 6:
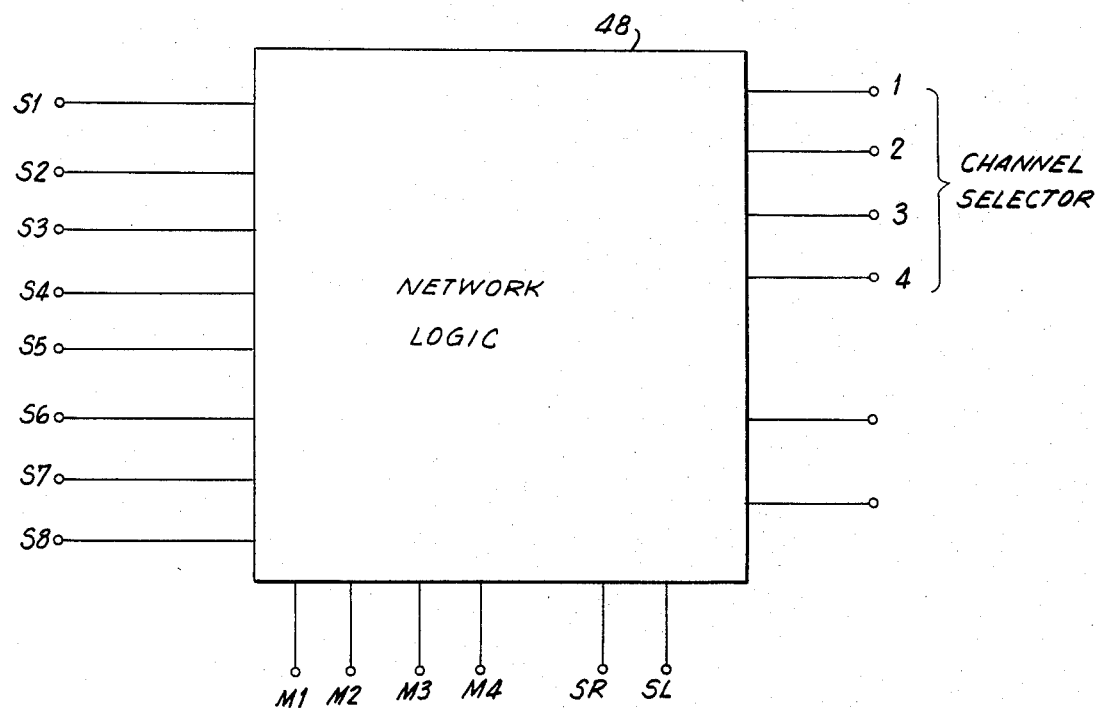
FIG. 6 is a block diagram of a typical logic network for use in the system of the present invention.
Figure 7:
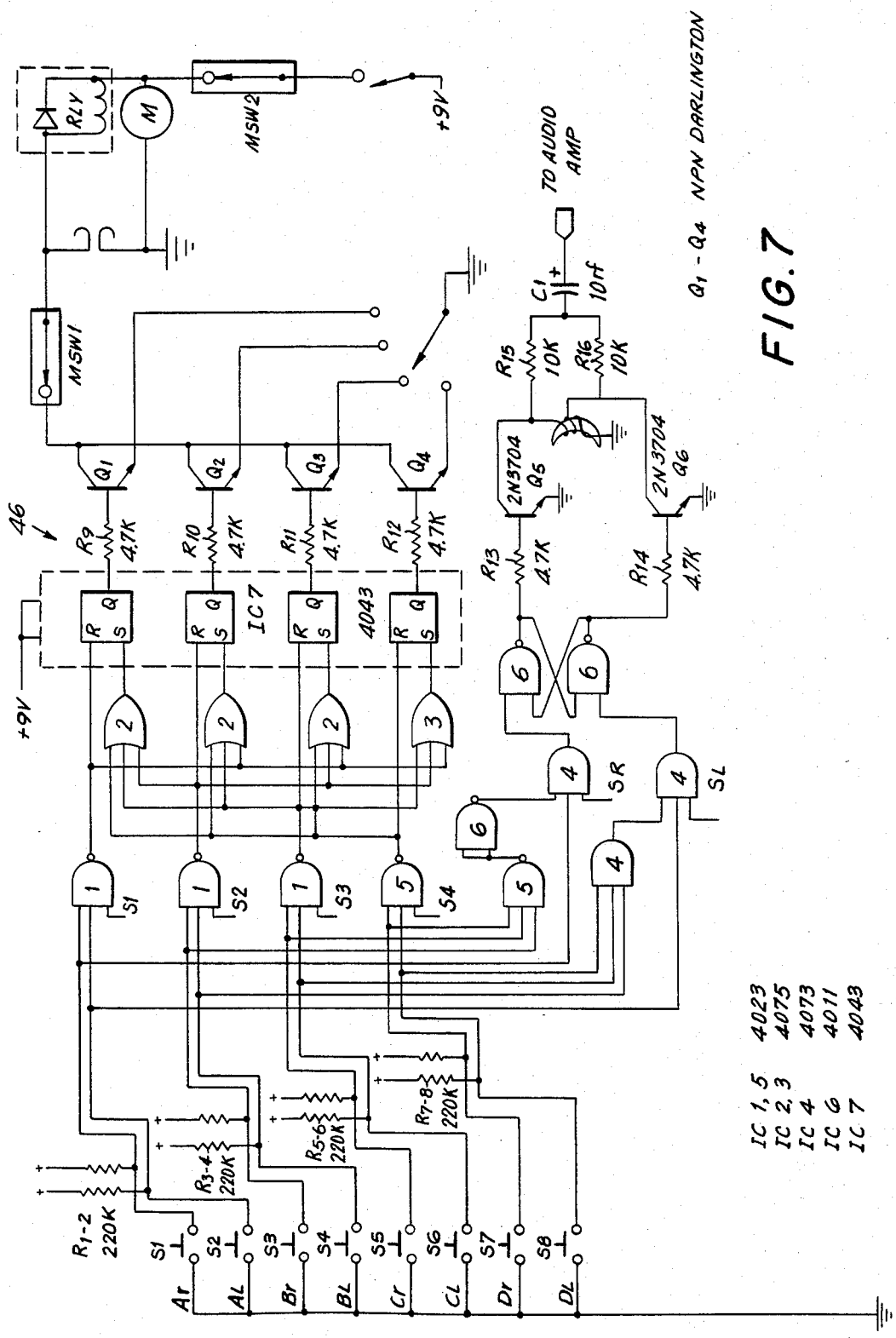
FIG. 7 is a schematic diagram, partially in block, of the logic network of FIG. 6.
Figure 8:
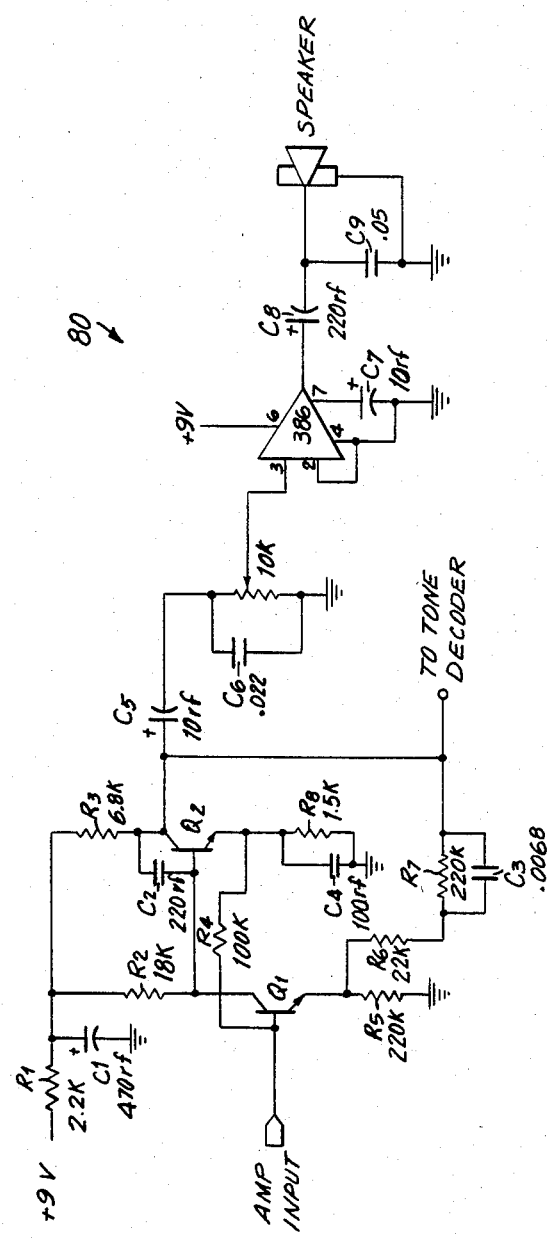
FIG. 8 is a schematic diagram, partially in block, of the audio amplifier of FIG. 5.

With respect to the logic network 48, this logic network is shown in block form in FIG. 6 and in a logic schematic in FIG. 7. With respect to the logic schematic in FIG. 7, FIG. 7 illustrates a typical condition responsive logic network 48. The logic employed in logic network 48 is commercially available logic and each of the logic components have been labeled with their commercially available logic component number. Accordingly, the circuit 48 of FIG. 7 will be readily understood by one of ordinary skill in the art and need not be described in any greater detail hereinafter.

Suffice it to say that the various circuit components comprising the system 20 of the present invention in the schematics of FIGS. 7-10, as well as in the block diagrams of FIGS. 1-6, may readily be understood by one of ordinary skill in the art by reference to FIGS. 1 through 10 each of which contains commercially available components appropriately labeled. Thus, further explanation of these components is unnecessary, particulary when considered in light of the explanation of the operation of the system 20 of the present invention with respect to interactive programming contained herein. In this regard, as was previously described, different weighted signal values, such as preferably in terms of different pulse count values, are placed on each of the simultaneously transmitted inputs or interactive channels in the midband range with the various weighted signal values or pulse counts being selected in accordance with preassigned values determined by the operator of the program, such as whether the answer is correct or wrong. Thus, it should be understood that the various weighted signal values are determined by the creator of the program so that these values are preferably determined at the head end prior to the transmission of the interactive program. Generally, it would be expected that a greater pulse count would be associated with a correct answer than with an incorrect answer although, if desired, the various incorrect answers could also be weighted accordingly with respect to most incorrect, the next most incorrect, the least most incorrect, and the correct answer if the programming called for this. Again, in the example of interactive programming in which the user or subscriber was creating a personalized adventure story, the various choices could have different associated point values which would ultimately be used to determine the ending. Once again, in the case of analytical programming such as advice to the lovelorn or stock portfolio analysis, the various choices rather than being correct or incorrect could have varying weighted signal values to create a personally tailored analysis based on the prior weighted responses of the subscriber, with different values being assigned in advance for different elements in a personal profile.

For example, assuming a question and answer program with four channels A, B, C and D being employed for the interactive programming, the table below illustrates a typical way in which pulses could be associated with the answers to provide different weighted values in the memory 64 for enabling automatic selection of a particular channel at a predetermined assessment period, such as when an assessment tone is provided from the head end and detected by logic network 48, so as to cause automatic generation of a response.

TABLE I

| | | | | |
|---|---|---|---|---|
| Ch.A | Q1 DP WA OPs | Q2 DP RA 2Ps | Q3 DP WA OPs | AT AS - All answers right |
| Ch.B | Q1 DP RA 2Ps | Q2 DP WA OPs | Q3 DP WA OPs | AT AS - Fairly good work |
| Ch.C | Q1 DP WA OPs | Q2 DP WA OPs | Q3 DP WA OPs | AT AS - Not very good work |

TABLE I-continued

| Ch.D | Q1 DP WA 0Ps | Q2 DP WA 0Ps | Q3 DP RA 2Ps | AT AS - Poor performance |
|---|---|---|---|---|

KEY
Q1,Q2,Q3 = Questions 1,2, and 3
0Ps = Zero pulses on this channel
DP = Decision point where user
2Ps = Two pulses on this channel chooses an answer and therefore switches channels
AT = Assessment tone
AS = Automatic switching where the circuit automatically switches to the appropriate channel
WA = Wrong Answer
RA = Right Answer In the above example, the predetermined sampling interval prior to the assessment period consists of three questions and answers, although any desired sampling interval can be employed. It should be noted that preferably the assessment period does not erase the memory 64 or memory 65, such erasure only occuring after provision of a reset pulse. Thus, effectively a sub-total and appropriate selection based thereon can be provided with further memory accumulation occuring thereafter. The amount of accumulation possible is solely dependent on the capacity of the memory 64 and/or memory 65 during the predetermined sampling interval and the various maximum pulse count values possible. In the above example, the subscriber who would have chosen channel B for the first question, channel A for the second question, and channel D for the third question would have accumulated 6 points in memory and, if the assessment tone were detected at that point, since 6 pulses had been accumulated in memory 64, this would cause the generation of a selection signal which, assuming quartiling were employed, would cause selection of channel A which would contain a response informing the subscriber that, by way of example, all answers were correct up to that point. In creating the actual interactive program, the question sequence would preferably appear on all channels with the answer sequence being different on all channels, such as described in my aforementioned patents which are incorporated by reference herein, with the program containing assessment tones and particular responses at desired points which would be based on the pattern or sequence of answers selected by the individual subscribers.

As was previously mentioned, this type of interactive programming with the accumulation of weighted signal values in the memory 64 and/or memory 65 can be used to have the subscriber create his or her own individualized story such as by leading an underwater diving team or space exploration team. As the story unfolds, various decisions, emergencies and unexpected events would confront the subscriber who must decide what to do at every turn. As these decisions are made, the subscriber could immediately see and hear the results of the judgment made or could preload these choices if the programming called for this. The memory circuit 64, 65 together with the logic network 48 thus make it possible for the overall performance of the in-home subscriber to be interactively readily individually evaluated in a one way system. At each decision point in the story the creator of the interactive story programming would have assigned various pulses for each of the possible selections so as to vary the weighted signal values with better decisions being associated with greater pulse values, for example, and poorer decisions being associated with fewer pulses. Moreover, more important decisions can have higher weighted signal values than less important decisions so that they can be deemphasized, certain decisions, which can be mere academic decisions, can have no pulse values and catastrophic decisions can have excessive pulse values. At the end of the story, or at various points throughout the story, the assessment tones would be transmitted and received by the individual subscribers. Each of the four channels, in the above example, could represent different degrees of performance as well as different automatically selected choices. As was previously mentioned, with respect to analytical programs, by way of example, the memory circuits 64, 65 and the logic network 48 could be employed to provide a personalized or tailored analysis based on various responses of the individual subscriber. For example, if it was a makeup analysis, an expert in the field could have been used to create the interactive program and this expert could appear in the video presentation sitting and asking questions showing various looks and discussing what products to use. The subscriber could then be asked questions on various items which would be used to create an individual personal profile, such as hair color, pore size, skin color, skin texture, eye color, etc. and, if desired, a complete analysis could be formulated around the subscriber's needs. Even pictures could be shown illustrating what various shades and applications look like. Again, various pulse values would be awarded for various answers and at various intervals in the program, the subtotals obtained in the score memory 64 could be evaluated and an interim analysis given, which could be highly personalized, employing either the quartiling or stacking technique, or both, previously described. Again, however, this analysis would be private to the subscriber. With respect to the story creation aspect, as previously mentioned, by using quartiling, for example, in conjunction with the memories 64, 65 and logic 48, a subscriber could give a preliminary input about the type of story that the subscriber would like to see and hear and this created profile can be used to automatically select an "individualized" story, or even individually television commercials, by setting up preconditions for the incoming information being selected. Again, this technique could be used for game programming. Of course, the above various utilizations of the system of the present invention have been described in terms of four or eight channels however, of course, two channels could be employed if it was desired to reduce the channel capacity of the system 20 or to show two separate programs simultaneously over a four channel system with the corrections merely being limited to one of two choices instead of one of four or one of eight.

Figure 2:
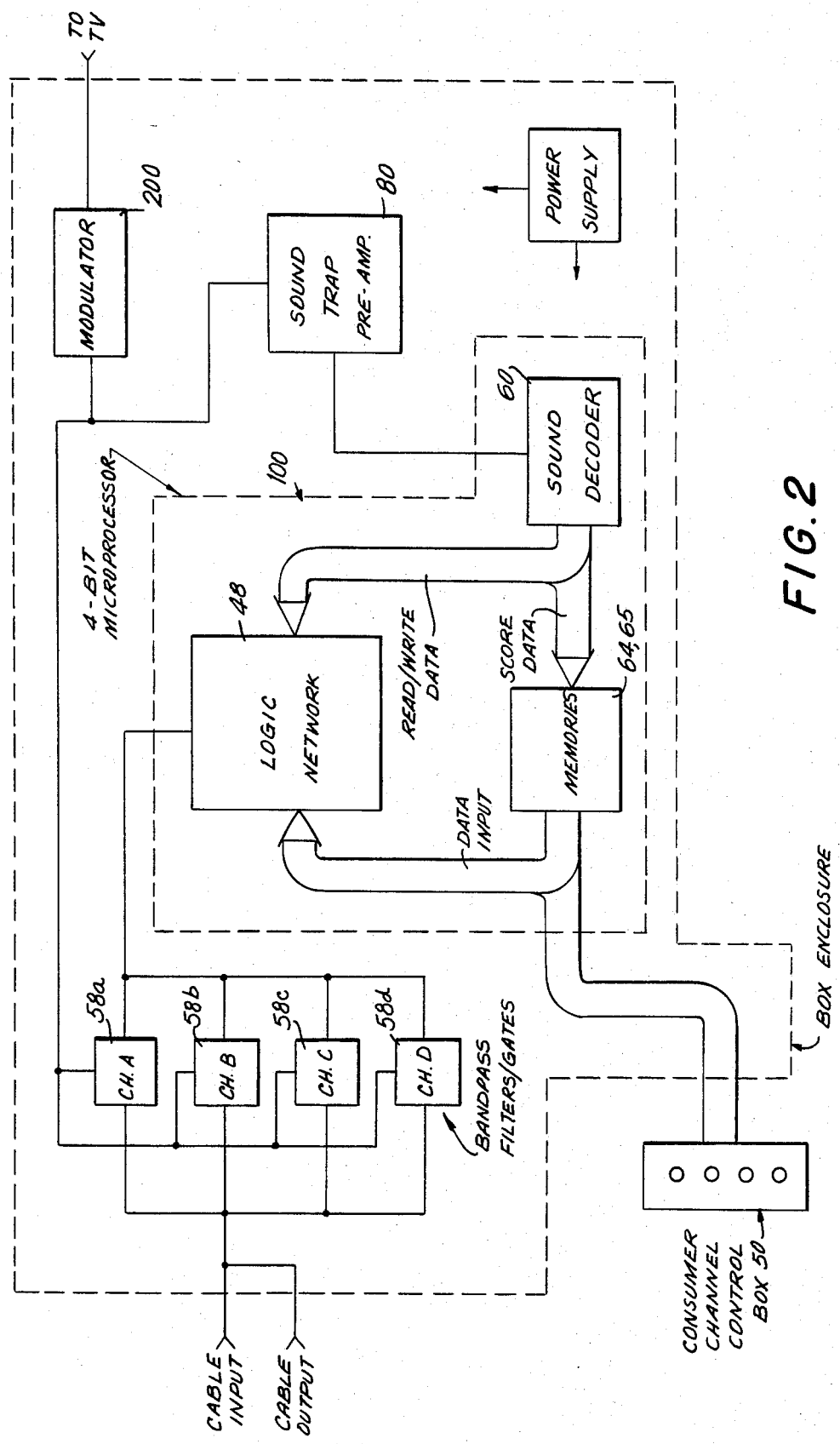
FIG. 2 is a diagrammatic illustration, similar to FIG. 1, illustrating the information flow in the system of FIG. 1.
Figure 11:
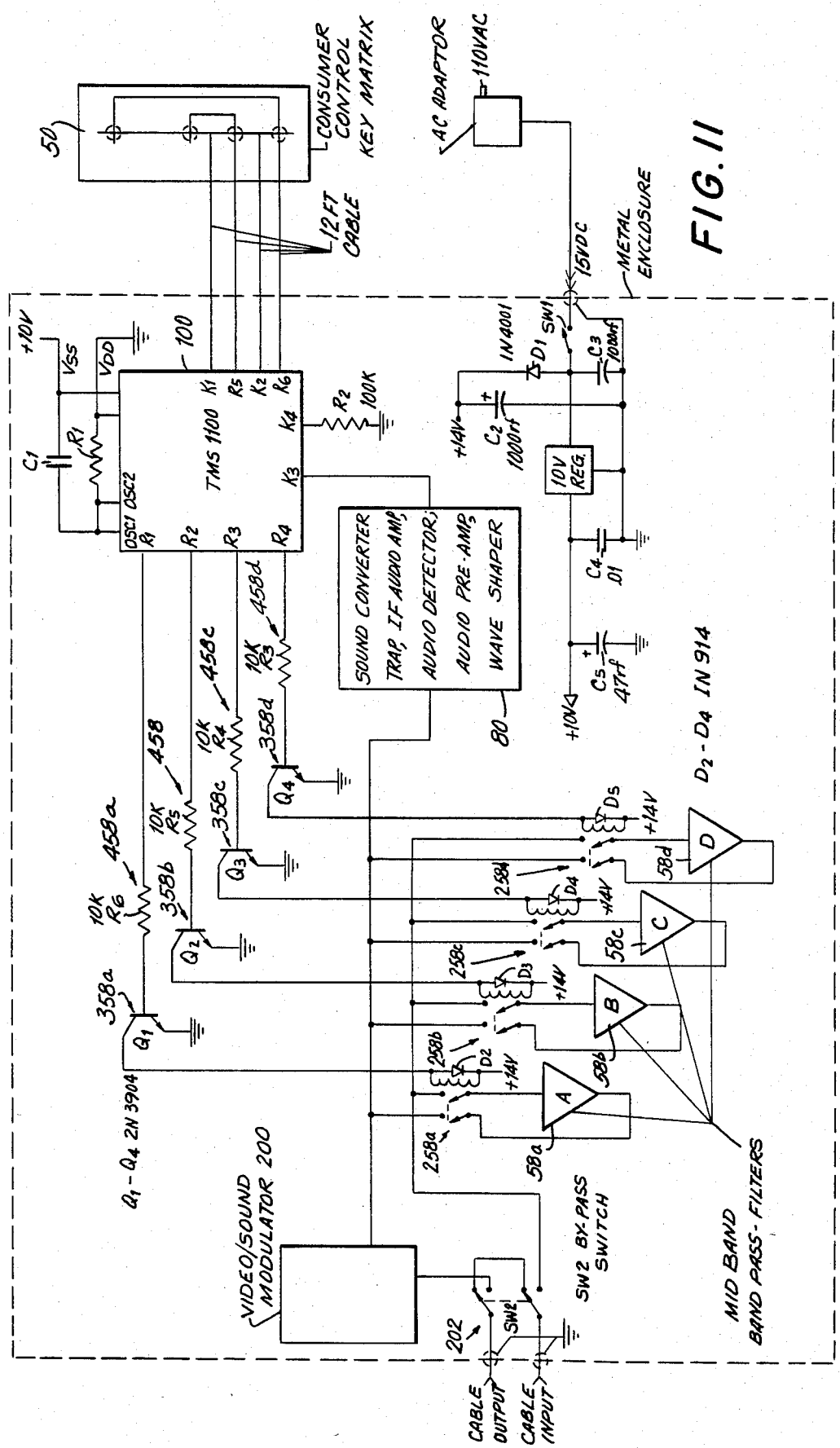
FIG. 11 is a schematic diagram, partially in block, of the in-home portion of the system of the present invention.

Referring once again to FIG. 11, a schematic diagram, partially in block, of the presently preferred embodiment of the in-home portion of the system of the present invention is shown, with FIG. 11 being similar to the information flow diagram of FIG. 2. Thus, as shown in FIG. 11, the four bit microprocessor 100 may be a conventional TMS 1100 microprocessor which, as previously mentioned, controls the selection of the channel from either the external channel control box 50 or from digital signal information supplied to the input of the microprocessor 100, such as a 2 kilohertz serial digital command signal applied to the K3 input of the microprocessor 100. This digital information, which is preferably transmitted from the head end, is trapped out in the soundtrap preamplifier 80 which consists of a conventional sound converter and trap, IF audio amplifier, audio detector, audio preamplifier and wave squarer which processes the digital signal. Thus, as previously mentioned, the microprocessor 100 acknowledges the input data and performs a particular instruction according to the decoded command signal. As was previously mentioned, the microprocessor 100 powers up to channel A when power is applied which automatically resets the memories 65, 65 to zero. As shown and preferred in FIG. 11, each of the midband bandpass filters 58a, 58b, 58c and 58d has an associated relay 258a, 258b, 258c and 258d, respectively, and an associated output transistor 358a, 358b, 358c and 358d respectively, such as the NPN transistors illustrated in FIG. 11, which are driven via respective output resistors 458a, 458b, 458c and 458d. Thus, when the appropriate output resistor drives the respective NPN transistor into conduction, the associated relay is energized, with only one midband relay 358a through 358d preferably being energized at any given time. A typical set of digital commands for the microprocessor 100 is illustrated below in Table II.

TABLE II

| DIGITAL COMMANDS | |
|---|---|
| DIGITAL WORD | COMMANDS |
| 1 | Change Channel |
| 2 | Score Table 1 |
| 3 | Score Table 2 |
| 4 | Score Table 3 |
| 5 | Return to Previous Channel |
| 6 | Return to Channel 1 |
| 7 | Score Memory Reset |
| 8 | 1 Point Score |
| 9 | 5 Point Score |
| 10 | Load Channel into Memory |
| 11 | Recall Memory Channel |

With respect to the above Table II, the internal RAM of microprocessor 100 preferably stores the incoming score increments and at any time can be reset or points added via digital word 8 or 9. The total score amount controls the selection when digital word 2, 3 or 4 is input or decoded via microprocessor 100 in accordance with the preselected channel selection scheme such as referred to above with respect to a quartiling code, or a stacking code, or a combination of both. This is illustrated below in Table III, with digital word 2 referring to a quartiling code and digital words 3 and 4 referring to a stacking code.

TABLE III

| SCORE TABLES | |
|---|---|
| DIGITAL WORD | SCORE TABLE USED |
| 2 | 1–21 CH 1 |
| | 22–42 CH 2 |
| | 43–63 CH 3 |
| | 64–84 CH 4 |
| 3 | 1–14 CH 1 |
| | 15–28 CH 2 |
| | 29–42 CH 3 |
| | 43–84 CH 4 |
| 4 | 1–42 CH 1 |
| | 43–56 CH 2 |

TABLE III-continued

| SCORE TABLES | |
|---|---|
| DIGITAL WORD | SCORE TABLE USED |
| | 57–70 CH 3 |
| | 71–84 CH 4 |

In addition, the microprocessor 100 has a memory register which can be requested to store the channel that has been selected at any time, such as in the above described example of preloading, by utilizing digital word 10, with this channel being recalled from memory by using digital word 11.

It should be noted that preferably the previously mentioned video/sound modulator 200 is a conventional channel 3/4 color modulator, with a conventional bypass switch 202 being provided to allow normal TV channel viewing to occur. Furthermore, it should be noted that the digital word rate, such as the aforementioned exemplary 2 kilohertz rate can be increased to a faster rate such as by a serial-to-parallel shift register with appropriate filtering to roll off the high frequency digital word information from being passed to the modulator which, under certain circumstances may require a single stage amplifier for driving the modulator. Moreover, if desired, the system can be arranged so as not to perform any operation until digital word 1 is transmitted or can be arranged so that it operates immediately on each instruction, or a combination of the above can be employed, with different digital words being employed to change modes. Summarizing the above, interactive programming may be provided which can enable both manual and automatic selection of various interactive responses from simultaneously transmitted programming on different channels. Preferably, in a cable television system, the channels used to transmit the interactive programming are the midband channels with the selected response being converted to a common television channel frequency for reception and display. Automatic selection may then be accomplished by the provision of a selection signal from the logic network to a local oscillator which, in turn, generates a beat frequency to be mixed with the various midband channel frequencies to convert the selected midband channel frequency to an assigned television channel frequency. The selection signal is either manually selected as a result of the choice or selection manually input by the subscriber or automatically generated as a result of the pulse count value accumulated in memory 64, 65, based on the weighted signal value of prior responses. However, none of the above conversion preferably occurs at the subscribers terminal until an enabling signal is transmitted and received from the head end, with each of the subscriber's being capable of displaying an individually tailored response to the common enable signals transmitted to all subscribers in the network. Thus, by utilizing the system of the present invention, a truly interactive programming one-way system having many of the attributes of a two-way system can be provided.

As used throughout the specification and claims the term "cable television" is meant to include any type of subscriber communication media including but not limited to microwave transmission and direct satelite to subscriber transmission of television programming.

What is claimed is:

1. An interactive communication system for providing an interactive information output over a common output channel from a plurality of substantially simultaneously remotely transmitted different information inputs, said system comprising:

an information output means capable of receiving said plurality of remotely transmitted different information inputs and selecting therebetween for selectively providing said interactive information output over said common output channel from one of said received plurality of remotely transmitted information inputs, said plurality of received information inputs containing different selectable information output segments interactively related to a common information message, each of said related selectable information output segments having an associated detectable weighted signal value, said information output means comprising means for selecting one of said information output segments for providing said interactive information output thererom;

detection means operatively connected to said information output selection means for detecting said associated weighted signal value of said selected information output segment;

accumulation means operatively connected between said detection means and said selection means for retrievably storing and accumulating said associated weighted signal value of said selected information output segments over a predetermined sampling interval for providing a retrievably stored accumulation signal having a value dependent on said accumulated associated weighted signal values during said predetermined sampling interval; and logic means operatively connected between said selection means, information output means and accumulation means for enabling selection of one of said plurality of selectable related information output segments during an assessment period in response to detection of an enabling signal by said logic means, each of said substantially simultaneously transmitted selectable inputs having an associated selection signal value, said logic means comprising condition responsive means responsive to said accumulation signal value and said enabling signal during said assessment period for providing a selection signal to said selection means dependent on said accumulation signal value, the possible accumulation signal values corresponding to the various available selection signal values; whereby an interactive information output may be automatically provided in accordance with an accumulation of the weighted signal values of prior interactive selections.

2. A system in accordance with claim 1 wherein said communication system comprises a subscriber television system comprising a television subscriber distribution network, said information output means comprising television receiver means, said remotely transmitted different information outputs comprising television signals transmitted over said subscriber distribution network, each of said different information outputs comprising a different television channel frequency.

3. A system in accordance with claim 2 wherein said television channel frequencies of said transmitted inputs are each at different frequencies in the midband range.

4. A system in accordance with claim 3 wherein said common output channel has an associated television channel frequency different from said midband range.

5. A system in accordance with claim 4 wherein said selection means comprises means for selectively converting said midband range frequencies into said common output channel associated frequency in response to said selection signal for providing a designated one of said information inputs at said common output channel frequency.

6. A system in accordance with claim 5 wherein said selection means comprises mixer means for selectively mixing said midband range frequencies with a beat frequency in response to said selection signal for providing a selected information segment as said information output at said common channel television frequency.

7. A system in accordance with claim 6 wherein each of said selectable information segments has an associated pulse count value corresponding to said associated weighted signal value, said detection means comprising pulse counter means for detecting said pulse count value.

8. A system in accordance with claim 7 wherein said enabling signal comprises a tone signal, said logic means comprising tone decoder means for decoding said tone signal.

9. A system in accordance with claim 8 wherein said condition responsive means comprises means responsive to a quartiling type storage code for said accumulation signal for providing said selection signal.

10. A system in accordance with claim 8 wherein said condition responsive means comprises means responsive to a stacking type storage code for said accumulation signal for providing said selection signal.

11. A system in accordance with claim 1 wherein said transmitted different information inputs are each at different frequencies.

12. A system in accordance with claim 11 wherein said common output channel has a different associated frequency than said information inputs, said inputs not being directly receivable by said multichannel means for directly providing said information output on said multichannel means.

13. A system in accordance with claim 12 wherein said selection means comprises means for selectively converting said different information input frequencies into said common output channel associated frequency in response to said selection signal for providing a designated one of said information inputs at said common output channel frequency.

14. A system in accordance with claim 13 wherein said selection means comprises mixer means for selectively mixing said different information input frequencies with a beat frequency in response to said selection signal for providing a selected information segment as said information output at said common channel frequency.

15. A system in accordance with claim 14 wherein each of said said selectable information segments has an associated pulse count value corresponding to said associated weighted signal value, said detection means comprising pulse counter means for detecting said pulse count value.

16. A system in accordance with claim 15 wherein said enabling signal comprises a tone signal, said logic means comprises tone decoder means for decoding said tone signal.

17. A system in accordance with claim 16 wherein said condition responsive means comprises means responsive to a quartiling type storage code for said accumulation signal for providing said selection signal.

18. A system in accordance with claim 16 wherein said condition responsive means comprises means responsive to a stacking type storage code for said accumulation signal for providing said selection signal.

19. A system in accordance with claim 1 wherein said selectable information segments has an associated pulse count value corresponding to said associated weighted signal value, said detection means comprising pulse counter means for detecting said pulse count value.

20. A system in accordance with claim 19 wherein said enabling signal comprises a tone signal, said logic means comprising tone decoder means for decoding said tone signal.

21. A system in accordance with claim 20 wherein said condition responsive means comprises means responsive to a quartiling type storage code for said accumulation signal for providing said selection signal.

22. A system in accordance with claim 20 wherein said condition responsive means comprises means responsive to a stacking type storage code for said accumulation signal for providing said selection signal.

23. A system in accordance with claim 1 wherein said enabling signal comprises a tone signal, said logic means comprising tone decoder means for decoding said tone signal.

24. A system in accordance with claim 1 wherein said condition responsive means comprises means responsive to a quartiling type storage code for said accumulation signal for providing said selection signal.

25. A system in accordance with claim 1 wherein said condition responsive means comprises means responsive to a stacking type storage code for said accumulation signal for providing said selection signal.

26. A system in accordance with claim 1 wherein said information output means comprises a multichannel information output means.

27. A system in accordance with claim 26 wherein said communication system comprises a subscriber television system comprising a television subscriber distribution network, said information output means comprising television receiver means, said remotely transmitted different information outputs comprising television signals transmitted over said subscriber distribution network, each of said different information outputs comprising a different television channel frequency, said subscriber distribution network being capable of substantially simultaneously distributing selectable conventional subscriber television programming and said different information inputs for providing interactive programming to said television receiver means, said television receiver means comprising means capable of receiving both said conventional television programming and said different information inputs for providing said interactive programming; whereby said subscribers may select between said conventional television programming and said interactive programming on said television receiver means.

28. A system in accordance with claim 1 comprising subscriber selection means operatively connected to said accumulation means for enabling subscriber preloading of a plurality of values related to said weighted signal values into said accumulation means prior to said remote transmission of said different information inputs, said logic means comprising means responsive to said enabling signal and said preloaded weighted signal values during an assessment period during said remote transmission for enabling automatic selection of said interactive information output during said remote transmission in accordance with said preloaded values.

29. A system in accordance with claim 28 wherein said accumulation means comprises storage means for preloading different conditions which are interactively linked to each other.

30. A system in accordance with claim 28 wherein said communication system comprises a subscriber television system comprising a television subscriber distribution network, said information output means comprising television receiver means, said remotely transmitted different information outputs comprising television signals transmitted over said subscriber distribution network, each of said different information outputs comprising a different television channel frequency, said subscriber distribution network being capable of substantially simultaneously distributing selectable conventional subscriber television programming and said different information inputs for providing interactive programming to said television receiver means, said television receiver means comprising means capable of receiving both said conventional television programming and said different information inputs for providing said interactive programming; whereby said subscribers may select between said conventional television programming and said interactive programming on said television receiver means.

31. A system in accordance with claim 28 wherein said communication system comprises a subscriber television system comprising a television subscriber distribution network, said information output means comprising television receiver means, said remotely transmitted different information outputs comprising television signals transmitted over said subscriber distribution network, each of said different information outputs comprising a different television channel frequency.

32. A system in accordance with claim 31 wherein said enabling signals are remotely transmitted over said subscriber distribution network, whereby common enabling signals remotely transmitted to a plurality of subscribers can result in individualized interactive information outputs for each of said subscribers.

33. A system in accordance with claim 2 wherein said enabling signals are remotely transmitted over said subscriber distribution network, whereby common enabling signals remotely transmitted to a plurality of subscribers can result in individualized interactive information outputs for each of said subscribers.

* * * * *

UNITED STATES PATENT AND TRADEMARK OFFICE
CERTIFICATE OF CORRECTION

PATENT NO. : 4,507,680

DATED : March 26, 1985

INVENTOR(S) : Michael J. Freeman

It is certified that error appears in the above-identified patent and that said Letters Patent is hereby corrected as shown below:

Column 2, line 39: "segements" should read --segments--
Column 4, line 57: "ineractive" should read --interactive--
Column 7, line 13: "interctive" should read --interactive--

Signed and Sealed this

Seventeenth Day of February, 198:

Attest:

DONALD J. QUIGG

Attesting Officer

Commissioner of Patents and Trademarks